United States Patent [19]
Gross

[11] Patent Number: 4,776,093
[45] Date of Patent: Oct. 11, 1988

[54] METAL DEMOLITION SHEARS

[75] Inventor: Sol N. Gross, Pittsburgh, Pa.

[73] Assignee: AAA Steel and Enterprises Corporation, North Versailles, Pa.

[21] Appl. No.: 39,304

[22] Filed: Apr. 16, 1987

[51] Int. Cl.⁴ .............................................. B23P 19/00
[52] U.S. Cl. ........................................ 30/134; 30/228
[58] Field of Search ............... 30/134, 250, 228, 258;
  37/117.5; 414/722, 724, 740; 294/104

[56] References Cited

U.S. PATENT DOCUMENTS

| 4,198,747 | 4/1980 | LaBounty | 30/134 |
| 4,403,431 | 9/1983 | Ramun et al. | 30/134 X |
| 4,450,625 | 3/1984 | Ramun et al. | 30/134 |

Primary Examiner—Douglas D. Watts
Attorney, Agent, or Firm—Reed Smith Shaw & McClay

[57] ABSTRACT

A heavy duty shear featuring removable knife seats, knife blades and wear plates is disclosed. The removable components serve to protect the shear from excessive wear, and may be replaced with minimal labor in the field and without welding or cutting.

18 Claims, 8 Drawing Sheets

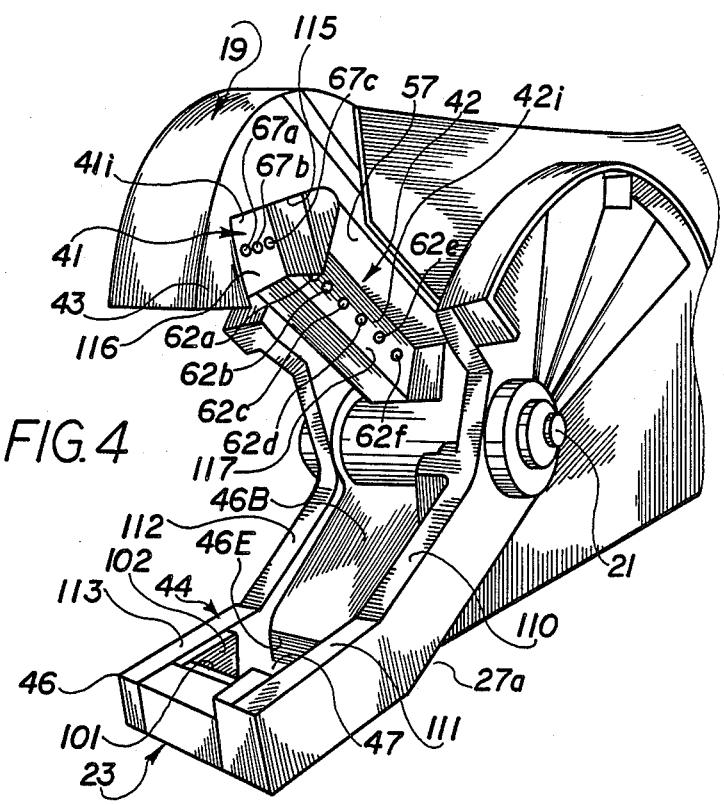
FIG. 4
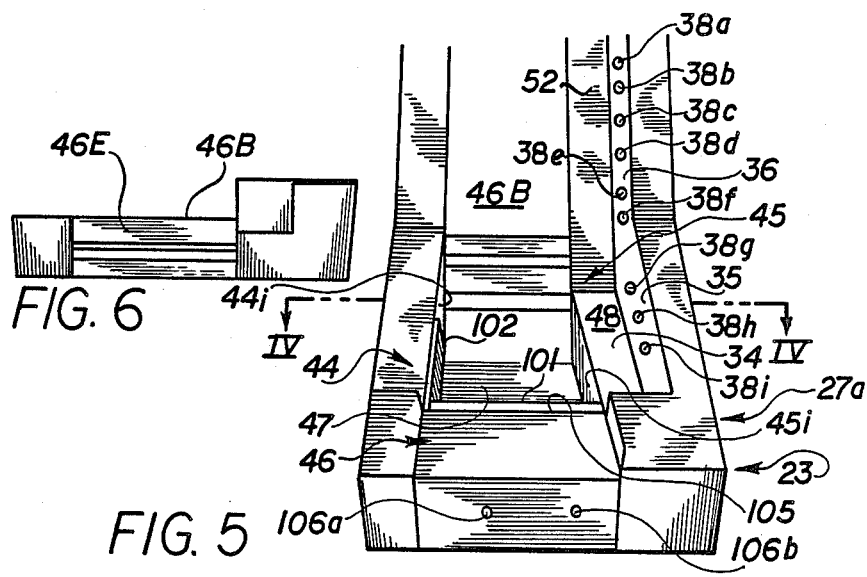
FIG. 6
FIG. 5

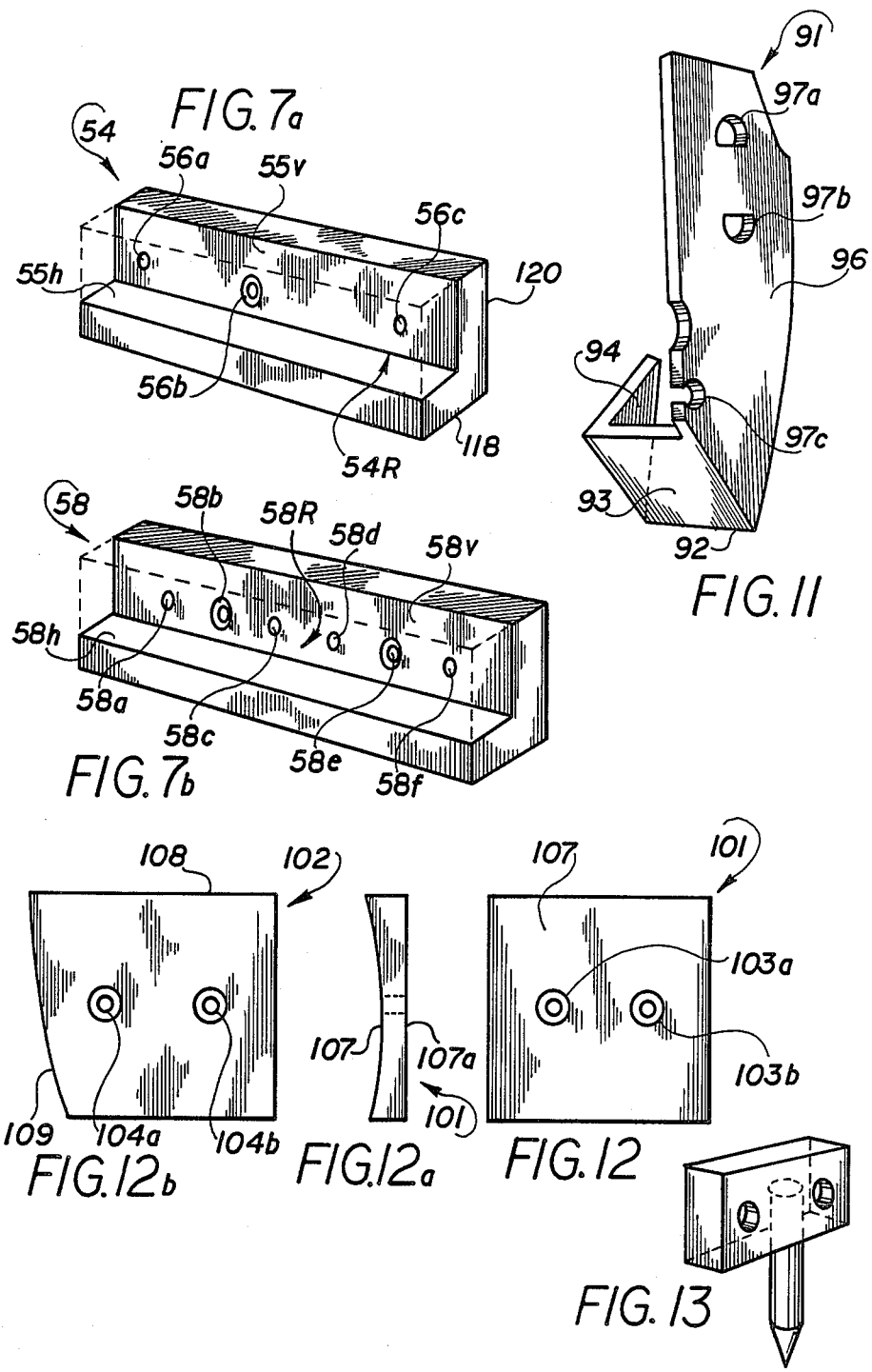

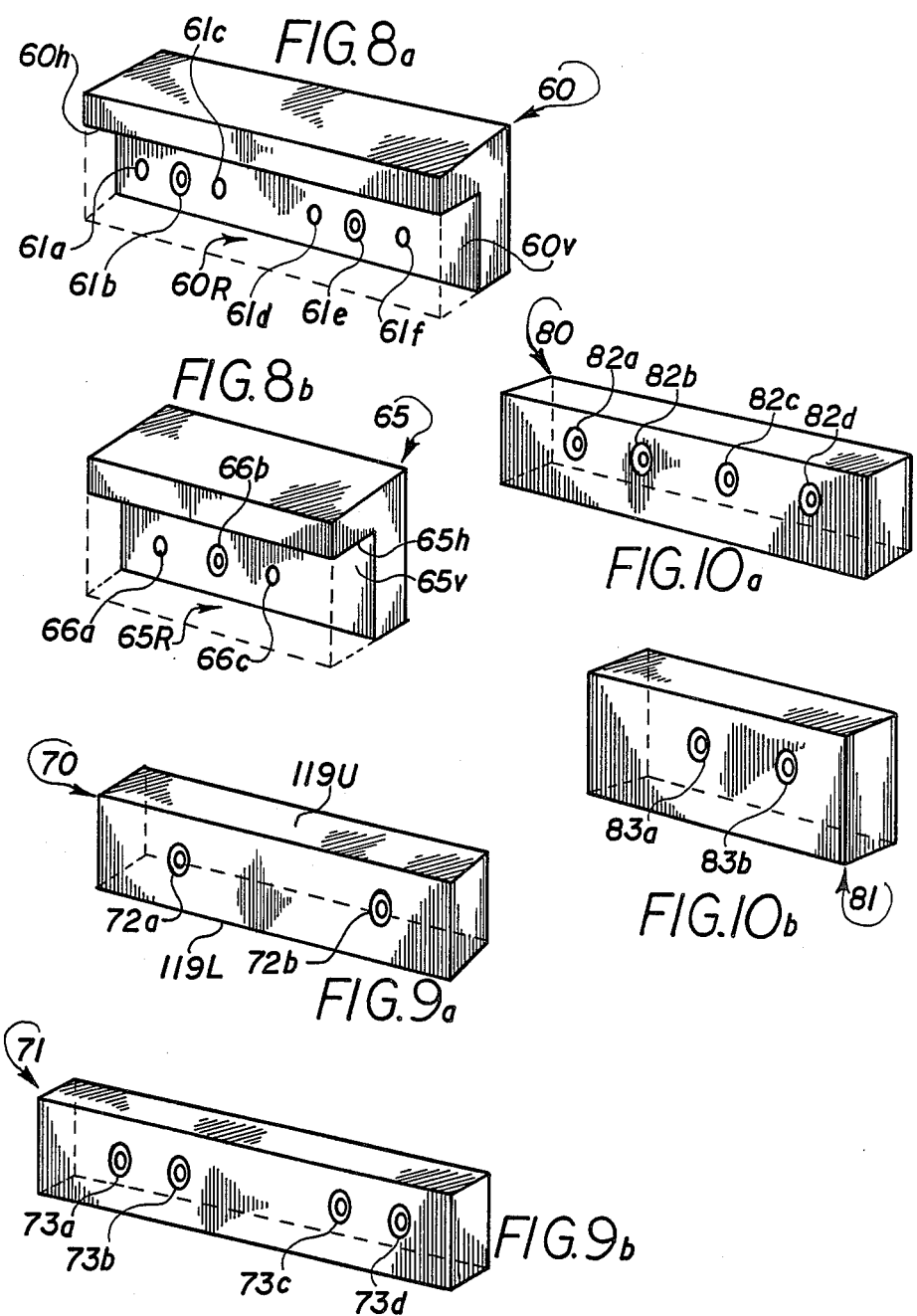

METAL DEMOLITION SHEARS

FIELD OF THE INVENTION

This invention relates to a heavy duty shear, especially adapted to be mounted on a rigid boom of a mobile vehicle, such as a back hoe.

BACKGROUND OF THE INVENTION

Heavy duty shears of the type powered by hydraulic cylinders have proven extremely useful in handling metal scrap of various sorts. Such scrap may be in the form of pipe made of steel, soft iron or cast iron; structural beams such as I beams, channels and fabricated girder beams; rods and heavy cables having diameters up to three inches; and larger metal sheets and plates and metal pieces that are cast, roll stamped or otherwise formed.

Typically, heavy duty shears such as those illustrated in U.S. Pat. No. 4,519,135 can be mounted on the dipper stick of a back hoe so that they may be controlled fairly well in handling various types of scrap. However, such shears have numerous disadvantages, such as not permitting the shear to be used as efficiently and rapidly as may be desired, considering the amount of scrap that must be reduced in size for further processing. A significant advance in the art would result if heavy duty shears could be developed that completed the desired result quickly and efficiently.

Moreover, the shearing and crushing surfaces of present-day hydraulic shears are susceptible to destructive wear and to the loss of the clean cutting surface during extended use. It would be useful to find a means to extend the useful life of such shearing attachments, and to improve the ease of replacing such attachments.

SUMMARY OF THE INVENTION

A principal object of the present invention is to provide an improved heavy duty shearing means for handling and severing metal scrap of all shapes and sizes. Another object of the invention is to improve maintenance and durability of heavy duty shears having a stationary lower jaw and movable upper jaw opposing the lower jaw and pivoted to it. The upper jaw is opened and closed by a hydraulic cylinder on a crawler tractor. Still another object is to provide a bolted removable upper jaw boot tip and also to provide both of the cooperating shearing surfaces with replaceable knife seat means that can extend the life of the jaws and shearing means. Yet another object of the invention is to provide a set of bolted, removable wear plates that extend the life of the shear and may be replaced in the field without welding and/or cutting.

These and other objects are accomplished by a dual jaw shearing device in which the lower jaw has a rigid guide plate extending parallel to a lower shear blade which is spaced therefrom. The guide plate and lower shear blade are pinned together at their outer free ends by a rigid closure member which retains them in a spaced orientation. The guide plate and lower shear blade are also connected at their inner ends by a plate welded therebetween. The lower jaw thus defines an open slot between the edge portion of the lower shear blade and the adjacent guide plate, which slot is adapted for receiving the outer edge of the upper shear blade as the upper jaw is closed. During closing of the jaws, after severing the scrap metal pieces, the shear edges traverse each other in a shearing relation. A significant clearance is thus provided between the upper shear blade and the guide plate allowing the upper jaw to traverse the open slot.

According to the present invention, the inside face of the upper jaw, and the inner face of the lower jaw are each provided with rectangular recesses along the generally longitudinal direction of the jaw. These recesses are positioned generally at the region which normally defines the opposing inner and outer cutting edge portions of the shears. Within these recesses a first and second pair of detachable elongate rigid knife means are mounted, thereby defining a new cutting edge portion. The knife means are readily detachable, permitting their cutting edges to be honed, replaced, or otherwise reconstructed after a period of heavy use. In operation, the knife means are well adapted to be slidingly engageable with each other and to travese each other during the shearing movement of the upper jaw. Each knife means includes an L-shaped knife seat, which supports a knife blade.

The shears also include a bolted removable boot tip, which conforms to the profile of the forward leading edge, or nip, of the upper jaw. The boot tip is mounted with countersunk and recessed bolts on one side face of the upper jaw, and acts as a wear plate during operation. The stationary lower jaw also carries a pair of bolted removable wear plates, one rectangular and the other trapezoidal. The rectangular wear plate is affixed to the inside face of the closure member while the trapezoidal wear plate is affixed to the inside surface of the guide plate. These removable wear plates protect the lower jaw from wear occasioned by the action of the upper jaw.

The wear plates, knife seats, knife blades, and boot tip are provided with countersunk holes to permit these components to be bolted in place such that the securing bolt heads lie flush with the surface of the bolted component. Bolting permits field replacement of all these components, offering significant advantages over other shears using welded components.

BRIEF DESCRIPTION OF THE DRAWINGS

FIG. 4 is a perspective view of the shear jaws detached from their hydraulic actuating components seen in the "open jaws" position without knife seats and blades;

FIG. 5 is a perspective view of the forward end of the lower jaw depicting the cavity for retaining the removable knife seats of FIG. 7;

FIG. 6 is a vertical section taken through lines VI—VI of FIG. 5, better showing the open slot and forward shoulder for one of the knife seat means of FIG. 7;

FIGS. 7a and 7b are perspective views of a first pair of the bolted, removable, angle-shaped knife seats for the lower jaws;

FIGS. 8a and 8b are perspective views of the second pair of the bolted, removable, angle-shaped knife seats for the upper jaws;

FIGS. 9a and 9b show the first pair of rectangular knife blades which are seated in the lower knife seats of FIGS. 7a and 7b with holes spaced to provide rotation of blades for use of four cutting edges;

FIGS. 10a and 10b show a dissimilar pair of knife blades which are seated and bolted in the upper knife seats of FIGS. 8a and 8b with holes spaced to provide rotation of blades for use of four cutting edges;

FIG. 11 is a left side perspective view (from the rearward side) of the bolted removable boot tip adapted for the upper jaw;

FIGS. 12, 12a and 12b show an elevation view of a pair of planar bolted removable wear plates that protect the lower jaw from abrasion by the upper moveable jaw;

FIG. 13 is a view of a bolted removable piercing point adapted to fit the lower jaw;

DESCRIPTION OF PRESENTLY PREFERRED EMBODIMENTS

Figure 1:
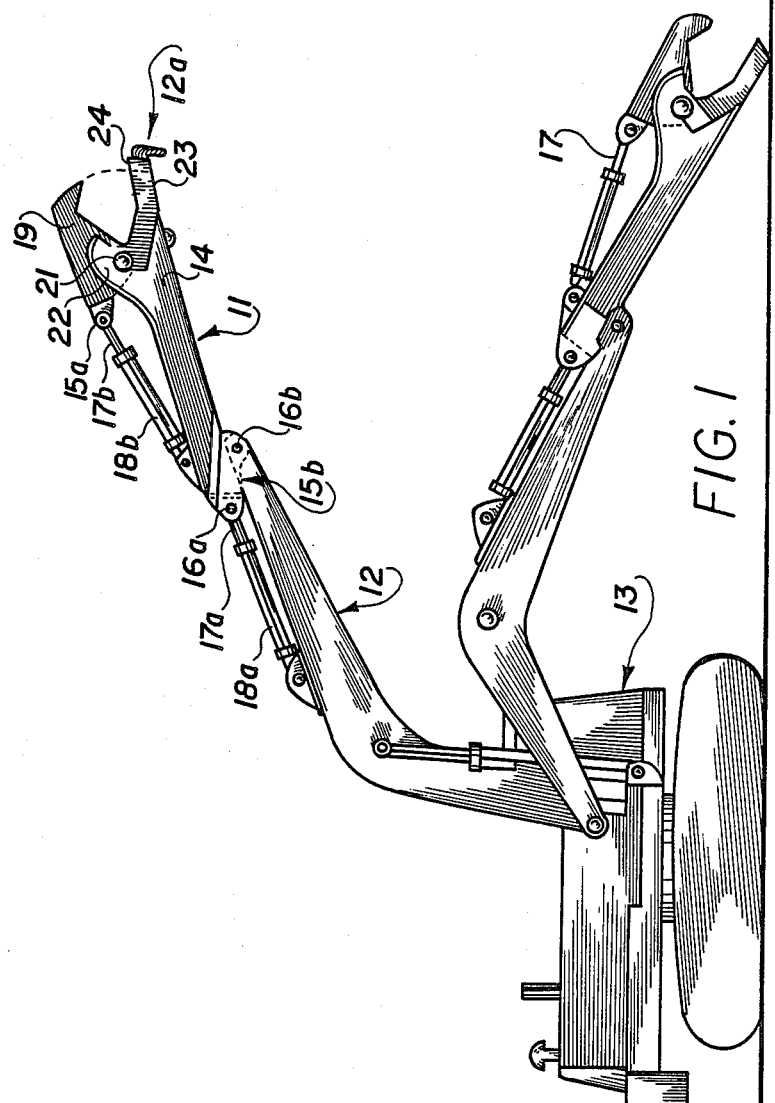
FIG. 1 is a schematic of a side view of a hydraulic shear in operation, shown with its support arm in the two extremes of its vertical range of travel, and both with the shearing jaws open.

Referring to FIG. 1, the modified shear attachment means, generally 11, of the present invention is mounted to a boom 12 of a mobile hydraulic crawler 13. A counterweight (not shown) is preferably mounted on the posterior end of the crawler 13 to insure stability. The shear attachment 11 includes an upper cylinder attachment 15a and a main frame 14 having a lower cylinder and boom attachment 15b. As shown in FIG. 1, the lower cylinder/boom attachment 15b is tapered, and has a pair of pivotal openings 16a and 16b. The pivotal opening 16b of the lower attachment 15b is adapted to pivotally receive a mounting pin (not shown), serving to mount the shear attachment means 11 to the boom 12. A first piston rod, 17a, moving reciprocally in an activated hydraulic cylinder 18a, allows the attachment means 11 to be raised or lowered about the mounting pin at the pivotal opening 16(b). A second piston rod 17b, moving reciprocally in an activated hydraulic cylinder 18b, is employed to activate the shear's upper jaw 19 about a jaws pivot, or main pin 21.

The main boom 12 is raised or lowered, as needed, to describe a wide arc for the shear attachment means 11. FIG. 1 shows the operable range between the highest and ground level positions for the boom 12.

The main frame 14 is provided with a main pin and housing 22 used for mounting and pivotally supporting the movable upper jaw 19 about the stationary lower jaw 23. Each side of the main frame includes a pivot housing and toroidal bearing (not seen), which operatively connects the upper jaw 19 to the lower jaw 23.

Figure 2:
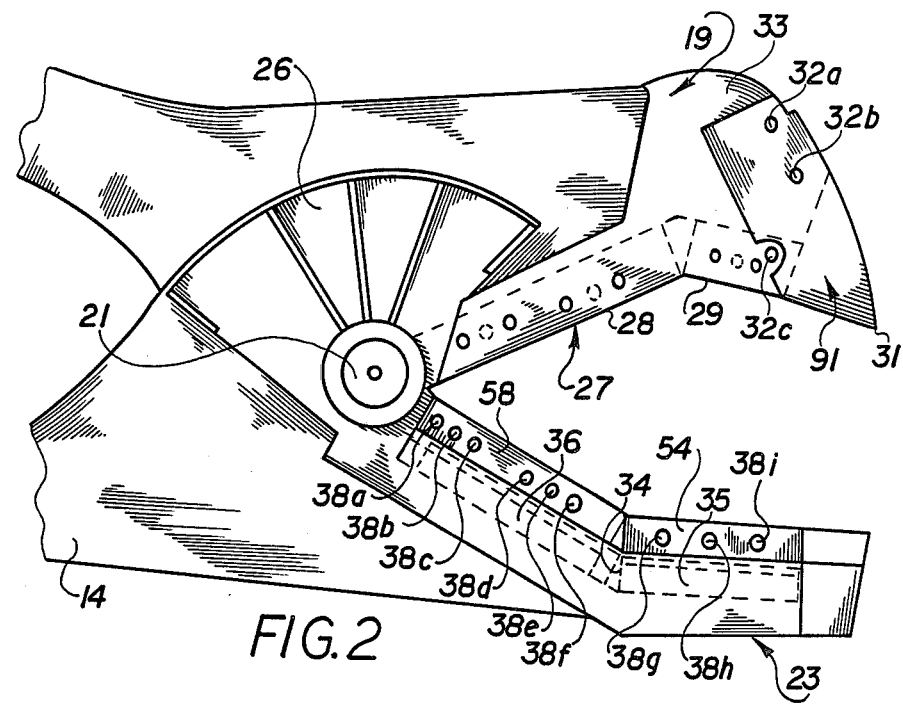
FIG. 2 is an enlarged right side elevation showing the working positions for the mounting of one set of the knife seat elements and boot tip of the present invention.

FIG. 2 is a right side elevation (from the operator's vantage point) which shows the major elements of the hydraulic shear, with the guide plate and removable wear plates omitted for clarity. The shear includes the lower or stationary jaw 23, which is attached to the main frame 14, which in turn is adapted for attachment to the boom 12 of the crawler vehicle. The upper jaw 19 moves within a bracketed arc, or slot, formed by reinforced plates and stiffeners 26 which also include a heavy thru bolt for stability. The upper jaw 19 is adapted for pivotal attachment to the lower jaw via a main pin 21. To enable such movement, the upper jaw 19 has an upper cylinder attachment 15a, which is adapted for pivotal attachment to the extendable piston rod 17b of the cylinder 18b (FIG. 1).

The upper jaw 19 defines an upper shear blade 27 which has inner and outer workpiece engaging portions, 28 and 29, respectively. As shown in FIG. 2, these shear blade portions are oriented obliquely and at an obtuse angle relative to each other. The shear blade portions also include a foremost planar surface 30, which has a projecting tip 31 on its outer periphery. The upper jaw 19 has a most forward lateral surface 33 adapted to receive a bolted removable boot tip 91 by the inclusion of a plurality of tapped holes, 32a through 32c, that will admit suitable bolts (not seen).

Figure 3:
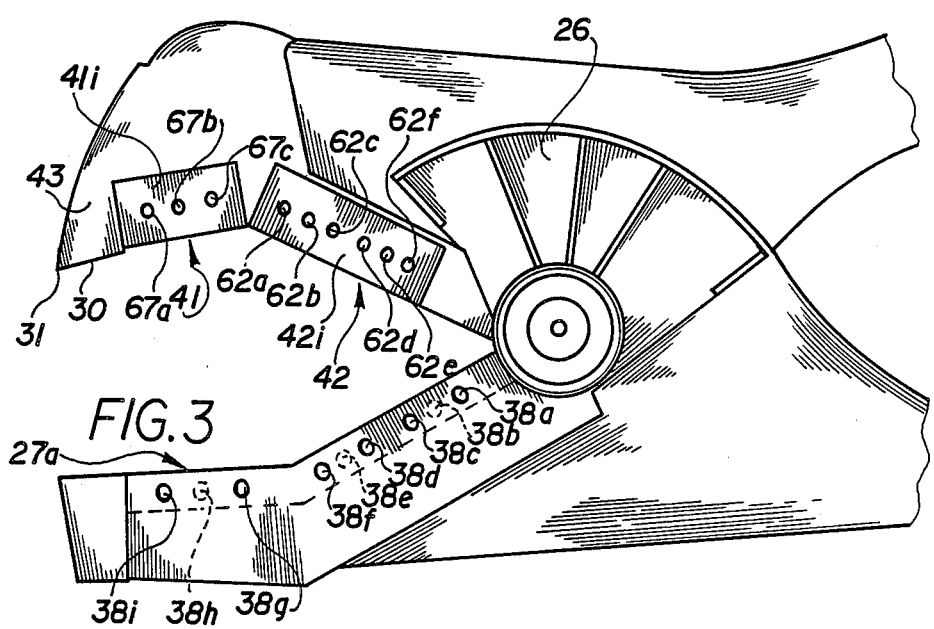
FIG. 3 is an enlarged left side elevation showing the mounting pockets for the knife seats and blades and the overlap surface for the bolted removable boot tip.

As shown in FIGS. 2, 3 and 5, the lower jaw 23 has a lower shear blade 27a and is provided with a longitudinal recess 34 which is partially defined by two abutting vertical planar surfaces, 35 and 36, that are oriented obliquely to one another. These inside surfaces of the recess 34 include a plurality of tapped holes, 38a–i, of which 38b, e and h are positioned for detachably mounting a first pair of the knife seat means (to be described) on the stationary lower jaw 23. These knife seat holes 38b, e and h permit the knife seats to be secured with threaded bolts to the jaw 23 while the knife blades (to be described) are being secured or removed for sharpening or rotation. The other holes 38a, c, d, f, g and i, are used to secure the knife blades, to be described.

FIG. 3 shows the opposing left lateral side of the upper jaw, revealing two obliquely set recesses 41 and 42, with tapped holes 62a–f and 67a–c, used for receiving removable bolted knife seats and knife blades (to be described), and a leading surface 43, for receiving the lateral face of a bolted removable boot tip. This side view is seen without any of the knife seats, knife blades, or the boot tip being mounted in their working positions.

In the perspective view of FIG. 4, the left lateral and forward sides of the hydraulic shears are seen as detached from the actuating components. The upper jaw 19 is seen without either of the knife means, as they would be mounted during use, in recesses 41 and 42, or a boot tip to be positioned on the leading surface 43. The lower jaw 23 comprises a lower guide plate 44 with wear plate 102 and a lower shear blade 27a which includes a lower shear plate 45 (FIG. 5), on which the lower knife seats (to be described) are mounted. The lower shear plate extends in a parallel and spaced-apart relationship from the guide plate 44, and is positioned forwardly from the jaws pivot 21.

The lower shear blade 27a further includes inner and outer workpiece engaging portions 110 and 111, respectively, oriented obliquely, at an obtuse angle to one another. The guide plate 44 also has an inner and outer workpiece engaging portions 112 and 113, respectively, oriented obliquely, at an obtuse angle to one another. These inner and outer portions assist in cradling a workpiece during shearing. The lower guide plate 44 and the lower shear blade 27a are spaced apart to define an open rectangular slot 47, into which the upper jaw 19 may be received. The slot 47 extends completely through the lower jaw as shown in FIG. 5. The lower guide plate 44 and lower shear plate 27a are rigidly interconnected at their outermost edges by a tie plate 46, bonded to the forward edge (not seen) of both the parallel guide plate 44 and shear plate 45.

FIG. 5 shows a head-on perspective view of the lower jaw 23. This provides a clearer view of the alignment of the lower shear blade 27a and guide plate 44 and the tie plate 46 in defining the rectangular slot 47. The lower shear plate 45 includes an abutting horizontal shoulder 48, which is stepped inwardly of the vertical planar surface 36.

The lower guide plate 44 and lower shear plate 45 each have inner opposing faces 44i and 45i, respectively. The opposing face 45i is stepped inwardly from the vertical planar surfaces 35 and 36. The open slot 47, defined partially by the lower guide plate 44 and lower shear plate 45, is partially enclosed by a connecting plate 46B. The forward area of the slot 47 remains open to receive the upper jaw projecting tip 31 when the jaws are fully contracted.

FIG. 6 shows a vertical sectional view of the lower jaw 23 taken along lines IV—IV. As shown in FIG. 6, the vertical edge face 46E of the connecting plate 46B, which defines the rearward periphery of the open slot 47, may be fabricated from a plurality of plates that may be cut, stacked and butt-welded to form the cross plate 46B.

FIGS. 7a and b depict two embodiments of the lower pair of L-shaped knife seats, or saddles, 54 and 58, which are detachably secured with bolts to the forward and rearward vertical planar surfaces 35 and 36, respectively, on the lower jaw 23 (see FIGS. 2 and 5). The knife seats 54 and 58 may be fabricated of an extremely hard, high carbon content steel, to provide durability over the course of multiple shearing contacts, and are angle iron (L-shaped) so as receive and support a knife blade (to be described).

The knife seat 54 is seen as being a reverse letter L, when viewed from its forward end, as it would be mounted adjacent the forward vertical planar surface 35. The overall length of the knife seat 54 is typically 15 inches, the height 8⅜ inches and the width 4½ inches. The machined, elongated inner surfaces 55h and 55v, define a recess 54R with dimensions of 6 inches high by 15 inches long by 2¼ inches wide, which will accommodate the knife blade, to be described.

Located on, and bored through, the vertical inner face 55v of the knife seat 54, are a plurality of spaced-apart holes, shown as 56a-c in the embodiment of FIG. 7a. The bored holes 56a-c are located so as to coincide with the corresponding holes, 38g-i, in the vertical planar surface 35 on the lower jaw 23. (FIG. 5) The complimentary configuration of the shoulder 48 and the vertical planar surface 35 of the lower jaw 23, for the knife seat 54, permits a firm seating of the knife seat, which is initially secured to the lower jaw 23 as shown in FIG. 2 by a single threaded bolt (not seen), which is passed through the bored hole 56b in the knife seat 54 and threaded into the tapped hole 38h of the lower jaw 23. The hole 56b is countersunk to permit the head of the securing bolt to lie flush with the inner face 55v of the knife seat 54.

FIG. 7b depicts a knife seat 58, the somewhat longer companion embodiment of the knife seat 54, adapted to seat upon the inclined shoulder 52 of the lower 23 (FIG. 5). The knife seat 58 is similarly seen as a reverse letter L when viewed from its forward end, as it would be mounted on the inclined shoulder 52 and adjacent the vertical planar surface 36.

The overall length of the knife seat 58 is 32 inches, its height is 8⅜ inches and its width is 4½ inches. The knife seat 58 has machined elongate inner faces, 58h and 58v, which define a recess 58R with dimensions of 6 inches high by 32 inches long by 2¼ inches wide, to accommodate a knife blade (to be described). Also positioned on and bored through the inner face 58v are a plurality of spaced apart bored holes, 58a-f. The bored holes are located to coincide with the tapped holes 38a-f on the vertical planar surface 36 of the lower jaw 23. The holes 58b and 58e are countersunk to admit a threaded bolt (not seen) to initially secure the knife seat 58 to the lower jaw. These threaded bolts are passed through the bored holes 58b and 58e into the corresponding threaded holes 38b and 38e, respectively, of the lower jaw, securing the knife seat to the abutting the surfaces 36 and 52 on the lower shear plate 45. As with the knife seat 54, the bored holes 58b and e are countersunk to permit the heads of the securing bolt to lie flush with the inner face 58v of the knife seat 58.

FIGS. 8a and b depict two embodiments of the upper pair of knife seats, 60 and 65, which are detachably secured in the rearward and forward recesses 42 and 41, respectively, on the upper jaw 19 (see FIGS. 3 & 4). The knife seats 60 and 65 are fabricated of an extremely hard, high carbon content steel and are angle iron (L-shaped), as earlier described.

The knife seat 60 is seen as being an inverted letter L, when viewed from its rearward end, as it would be mounted within the rearward recess 42. The overall length of the knife seat 60 is typically 32 inches, the height 8⅜ inches, and width 4½ inches. Its machined, elongated inner surfaces 60h and 60v define a recess 60R with dimensions of 6 inches high by 32 inches long by 2¼ inches wide, which will accommodate a knife blade to be described.

A plurality of spaced-apart holes, 61a-f, are bored through the vertical inner face 60v of the knife seat 60. These are located so as to coincide with the corresponding set of tapped holes, 62a-f, in the rearward recessed surface 42i on the upper jaw 19 (FIG. 4). The complementary configuration of the shoulder 57 on the inner face of the rearward recess 42 for the knife seat 60 permits a tight seating of the knife seat, which is secured to the upper jaw 19 adjacent to the surface 42i within the recess 42.

To initially secure the knife seat 60, a pair of threaded bolts is passed through the bored holes 61b and 61e. These bolts are then threaded into the tapped holes 62b and 62e of the recessed surface 42i of the upper jaw, and the knife seat 60 is secured in place. The holes 61b and 61e are countersunk to permit the heads of the securing bolts to lie flush with the inner surface 60v of the knife seat 60.

FIG. 8b shows a knife seat 65, the somewhat shorter companion embodiment of the knife seat 60, adapted to seat within the forward recess 41 of the upper jaw 19 (FIG. 4). The knife seat 65 is also seen as an inverted letter L when viewed from its rearward end, as it would be mounted adjacent the forward recess vertical surface 41i.

The overall length of the knife seat 65 is 15 inches, its height is 8⅜ inches and it has a width of 4½ inches. Its machined elongate inner faces, 65h and 65v, define a recess 65R with dimensions of 6 inches high by 15 inches long by 2¼ inches wide. A plurality of spaced-apart holes, 66a–c are positioned on and bored through the inner face 65v of the knife seat 65. These holes are located to coincide with the tapped holes, 67a–c, of the upper jaw 19 (FIG. 3). The knife seat 65 is mounted to the upper jaw 19 and secured within the recess 41 abutting the vertical surface 41i of the recess 41. To initially mount the knife seat 65, a single threaded bolt (not seen) is passed through the bored hole 66b and threaded into the threaded hole 67b of the upper jaw. As with the knife seat 60, the hole 66b is countersunk to permit the head of the securing bolt to lie flush with the inner face 65v.

FIGS. 9a and b depict a pair of knife blades, 70 and 71, respectively, which are securably positioned in the lower knife seats 54 and 58, respectively, of the lower shear blades 27a. The knife blade dimensions of blocks 70 and 71 meet precisely those of the recesses 54R and 58R, respectively, set forth above. The smaller knife blade 70 is provided with two bored and countersunk holes, 72a and 72b, which permit the knife blade to be secured by bolts to the underlying knife seat 54 via holes 56a and 56c in the knife seat 54. The knife blades are preferably constructed of tool steel.

The larger knife blade 71 has a similar set of bored and countersunk holes, 73a–d, which permit the knife to be secured by bolts (not seen) to the underlying knife seat 58 via holes 58a, c, d and f in the knife seat 58.

FIGS. 10a and b show the other pair of knife blades, 80 and 81, respectively, which are securely positioned to the knife seats 60 and 65, respectively, of the upper shear blade 27. As with the knife blades 70 and 71, the blade dimensions of knife blades 80 and 81 precisely complement those of the rectangular recesses 60R and 65R defined by the knife seats 60 and 65, respectively.

The larger knife blade 80 has a plurality of aligned bored holes 82a–d which are countersunk, permitting the knife blade 80 to be secured by bolts to the overlying knife seat 60 via corresponding holes 61a, c, d and f of the knife seat 60.

The smaller knife blade 81 has a set of aligned bored and countersunk holes, 83a and 83b, that permit the knife blade 81 to be mountably secured to the overlying knife seat 65, which, in turn, is mounted in the forward recess 41 of the upper jaw 19.

The countersunk holes in the knife blades 70, 71, 80 and 81 permit the securing bolt heads to lie flush with the shearing face of the knife blades to maintain the proper tolerance or shearing fit between opposing knife blades. The holes of the knife blades 70, 71, 80 and 81 are countersunk on both sides of the blades and positioned to allow the blades to be rotated so that all four cutting edges of each blade may be used.

To position to lower knife seats and knife blades, the lower knife seat 54 is mounted on the shoulder 48 and abutting the vertical planar surface 35 of the lower shear plate 45, with the recess 54R facing toward the rectangular slot 47. The appropriate holes are aligned and bolts inserted to secure the knife seat in place, as disclosed. The knife blade 70 is then positioned in the recess 54R of the knife seat 54, the appropriate holes are aligned, and bolts inserted to secure the knife blade 70 to the knife seat 54. The bolts used to secure the knife blade 70 are passed through the holes 72a and 72b of the knife blade, then through the holes 56a and 56c of the knife seat 54, and threaded through the tapped holes 38g and 38i of the lower jaw 23. These holes 38g and 38i pass completely through the lower jaw 23 and are counterbored on the outside face of the lower jaw 23. These counterbores receive nuts which secure the knife blade bolts. The nuts are tightened to snuggly secure the knife blade 70 and further secure the knife seat 54 in place on the lower jaw 23.

The same procedure is followed for the lower knife seat 58, which is positioned on the inclined shoulder and abutting the vertical planar surface 36 of the lower shear plate 45.

In similar manner to that described for the knife blade 70, the knife blade 71 is secured to the knife seat 58 via bolts passing through the corresponding holes in the knife blade 70, knife seat 58, and lower jaw 23.

When properly positioned, the lower knife seats, knife blades, and inside face 45i of the lower shear plate 45 form a planar vertical shearing surface comprising the lower shear blade 27a.

To secure the upper knife seats and upper knife blades, a similar procedure to that described for the lower seats and blades is used, except that the upper knife seats are installed within the recesses 41 and 42 of the upper jaw 19. Once installed, the upper knife blades 80 and 81, in conjunction with the upper knife seats 60 and 65 form a planar vertical shearing surface comprising the upper shear blade 27.

The removable knife seats of the present invention offer significant advantages over shears without knife seats. Shears without knife seats use knife blades mounted directly to the jaw within recesses in the shear jaws. Extended use of such shears causes the knife blades to become loose, creating wear on the jaw recess surfaces holding the knife blade, and compromising the extremely fine blade tolerances required for effective shearing. In order to correct such wear on the jaw surfaces, the entire shear must be removed from the field to a shop where the jaw recesses must be welded and machined prior to replacing the knife blades.

The present invention solves this problem by employing the removable knife seats, which act as a buffer between the jaw recesses and the knife blades. According to the present invention, the majority of the knife blade wear is inflicted on the underlying knife seats, rather than the jaw recesses. Once the knife seats become worn, they may simply be replaced in the field by removing the securing bolts, eliminating the need to haul the massive shears to a machine shop for welding and machinery repairs. Additionally, the knife seats provide a more acceptable surface for positioning shims between the knife blade and knife seat as knife blade wear occurs, than do other shears without knife seats.

As shown in FIGS. 4 and 5, the L-shaped knife seats shield the recessed surfaces of the upper and lower jaws from contact with the relatively hard tool steel blades. The knife seats also permit the shearing forces exerted on the knife blades to be spread out over a larger area of the jaw recesses than would be possible with other shears not using the L-shaped knife seats, thus reducing wear on the recessed surfaces 52, 48, 36, 35, 57, 115, 116 and 117 of the jaws.

In operation, the lower surface 119L of the knife blade 70 contacts the horizontal surface 55h of the knife seat 54. The lower horizontal surface 118 of the knife seat 54 contacts the horizontal shoulder 48 of the lower jaw. The upper surface 119U of the knife blade 70 contacts the workpiece to be sheared. This shearing action imparts shearing force to the knife blade 70, the vertical component of which is transmitted to the lower surface 119L of the knife blade 70. In turn, this shearing force is transmitted to the horizontal surface 55h of the knife seat 54, to the lower horizontal surface 118 and on to the horizontal shoulder 48.

The area of contact the lower horizontal surface 118 of the lower knife seat 54 makes with the horizontal shoulder 48 of the lower jaw 23 is 15 inches × 4½ inches, or 67.5 square inches. The surface area of the lower surface 119L of the knife blade 70 is equal to that of the surface 55h of the knife seat 54, or 15 inches × 2¼ inches, or 33.75 square inches. Because the lower horizontal surface 118 of the lower knife seat 54 has twice the surface area of the lower surfce 119L of the knife blade 70, the vertical shearing forces of the knife blade 70 are transmitted to the horizontal shoulder 48 of the lower jaw and distributed over an area twice as great relative to the same-sized blade mounted directly within the lower jaw without a knife seat. This distribution of shearing forces translates into less wear on the horizontal shoulder 48 of the lower jaw than would occur if the knife blade 70 were attached to the lower jaw without the benefit of the knife seat 54. Additionally, the vertical portion 120 of the knife seat 54 allows the horizontal components of the shearing force to be transmitted and distributed to the vertical planar surface 35 in much the same manner as that described for the vertical components of such forces, reducing wear on the surface 35. The same beneficial shearing force transmission and distribution obtains for the other knife seats and knife blades described.

Turning now to FIG. 11, a perspective view of the detachable boot tip 91 is shown. The boot tip 91 is single-side mounted on the forward lateral surface 33 of the upper jaw 19 (FIG. 2). The boot tip 91 has a frontal width 92 sufficient to embrace the formed apex of the projecting tip 31 of the upper jaw 19. The mounted lowermost boot face 93 is in flush contact with the forward position of the undersurfce 30 of the upper jaw 19. This boot face may include a raised pointed portion (not shown) to effectuate better piercing and removal of material to be sheared. The left side of the boot tip 91 includes a triangular retracted plate 94 which overlaps the left leading surface 43 of the upper jaw 19 (FIG. 3).

The larger right-side lateral surface 96 of the boot tip 91 is configured to conform to the forward lateral surface 33 on the right side of the upper jaw 19. This surface 96 acts as a wear plate protecting the upper jaw, and interfaces with one of the wear plates secured to the lower jaw (to be described).

The boot tip 91 is provided with a plurality of holes, 97a–c, which coincide with holes, 32a–c, in the upper jaws forward lateral surface 33 (FIG. 2). The holes permit the boot tip 91 to be securely bolted to the upper jaw 19, using specially-designed bolts with heads and countersunk holes designed to prevent the bolts from turning during use. The advantage of employing a bolted removable boot tip 91 is to protect the front portion of the upper jaw, which is subject to much wear during shearing operation. When the boot tip becomes worn, it may be unbolted and replaced in the field.

FIG. 12 shows a pair of detachable components, including a rectangular wear plate 101, and a trapezoidally-shaped wear plate 102. These wear plates are constructed of a durable alloy in order to provide the wear plates with longevity in use. Both wear plates have a thickness of about 1¼ inches. Each plate 101 and 102 is provided with at least one pair of centralized countersunk holes 103a and 103b, 104a and 104b, respectively, which admit bolts (not seen) for mounting. The countersunk holes permit the heads of the securing bolts to lie flush with the exposed face of the wear plates.

The wear plate 101 is mounted on the inside face (not seen) of the tie plate 46 of the lower jaw. 23 as shown in FIG. 5. The wear plate 101 is positioned on the inside surface 105 of the tie plate 46, and held firmly by bolts, the locking nuts of which are seen at 106a and 106b of the tie plate 46. These bolts are received by bored holes (not seen) in the tie plate 46. The locking nuts are received by counterbores in the front of the tie plate 46.

Also shown in FIG. 12a is a side view of the wear plate 101. As shown, the wear plate 101 has a flat surface 107a and a concave surface 107. The flat surface 107a of the wear plate 101 contacts the inside surface 105 of the tie plate 46 when the wear plate 101 is mounted thereon. The concave surface 107 faces the open slot 47, and is contoured such that the boot tip 91 may pass through the open slot 47 without causing undue wear on the wear plate 101. The concave surface 107 of the wear plate 101 is contoured to reflect the same arc described by the boot tip 91 during the boot tip's downward travel. This concave surface of the wear plate permits the boot tip to pass the wear plate, reducing significantly the degree of abrasion that would occur with a flat-faced wear plate. Such abrasion would result from the build-up of dirt, debris, etc., that would occur in the small space between the arcing boot tip and a flat-faced wear plate.

The trapezoidal wear plate 102, shown in FIG. 12b, is positioned in the right side lateral surface of the lower jaw, and on the inside face 44i of the guide plate 44, as shown in FIGS. 4 and 5. The forward edge 109 of the plate 102 abuts the right side of the concave surface 107 of the retaining wear plate 101. This forward edge 109 is contoured to match the concave surface 107 of the wear plate 101. The trapezoidal periphery of the wear plate 102 complements the forward contour of the inside face 44i adjacent to the tie plate 46.

The wear plates 101 and 102 permit multiple cycles of jaw closure without causing excessive wear to the tie plate 46 and the guide plate 44 of the stationary lower jaw 23, where the tie plate 46 and guide plate 44 interface with the reciprocating upper jaw. The top edge 108 of the wear plate 102 is chamfered, to permit the wear plate 102 to lead the wear plate 96 associated with the boot tip 91 past the wear plate 102, as the upper jaw 19 traverses the lower jaw 23 down through the open slot 47.

FIG. 13 shows a removable piercing point adapted to be detachably affixed to the lower jaw. The piercing point has a set of holes which permit the point to be bolted to the frontal portion of the tie plate 46. The piercing point may be used to pierce and pull material from a structure being demolished.

Figure 14:
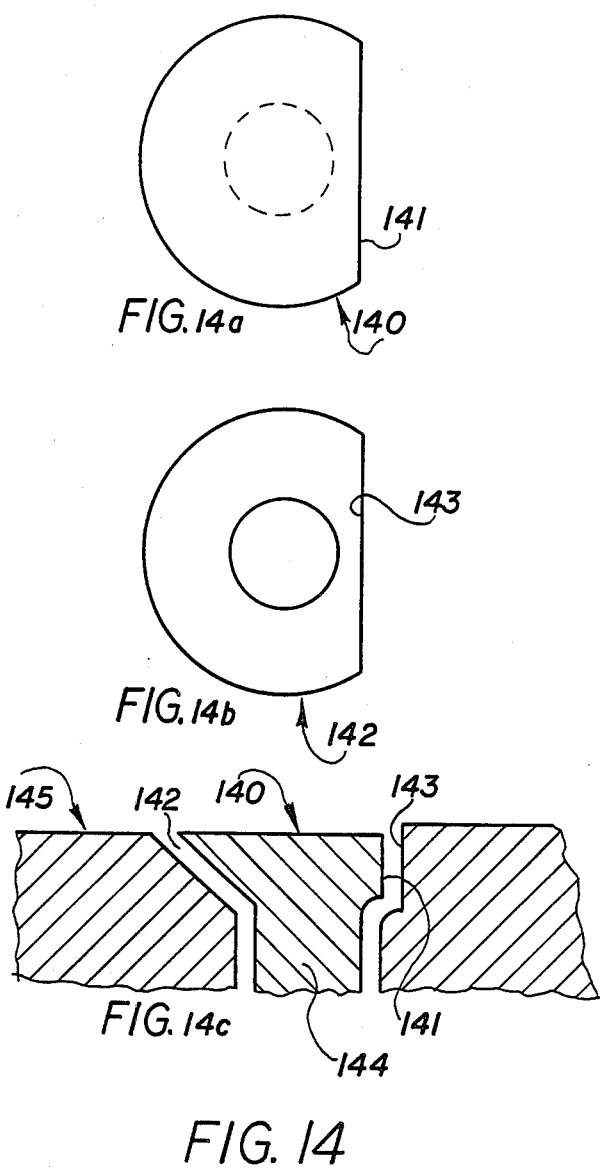
FIGS. 14a and 14b show the specially-designed bolt head and countersunk holes used in connection with the removable components.
FIG. 14c is a cross sectional view of a specially-designed hole and bolt head, showing the countersunk hole and bolt head.

FIGS. 14a, 14b and 14c depict the specially-designed bolt head and countersunk hole used in a preferred embodiment of the present invention. The design prevents the bolts used to secure the removable components, such as the wear plates, knife seats, knife blades, boot tip and piercing point from turning and becoming loose during operation. Additionally, the design assists in engaging the bolt so that the accompanying nut may be tightened.

As shown in FIG. 14a, the bolt head, generally 140, has an elongated flattened portion 141. The countersunk hole, generally 142, also has an elongated flattened portion, 143. This specially designed countersunk hole is preferably formed by casting the component 145 containing the hole 142. As shown in FIG. 14c, the flattened portion 143 of the countersunk hole engages with the flattened portion 141 of the bolt head, preventing the bolt head 140 from turning, thereby loosening the bolt 144 and the removeable component 145. In practice, these specially-designed bolt heads and countersunk holes may be used in conjunction with any and all of the removeable components disclosed, in order to prevent the bolts securing those components from loosening during operation of the shear.

Figure 15:
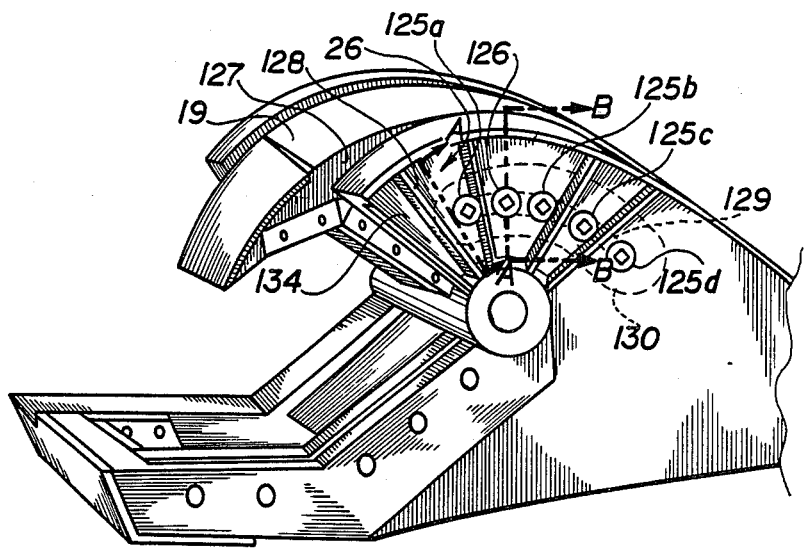
FIG. 15 is a perspective view showing upper jaw wear plates, a tie bolt, and adjustable alignment guides.
Figures 16, 17:
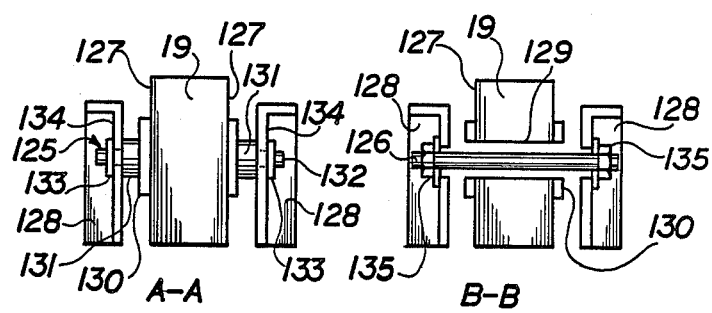
FIG. 16 is a sectional elevation view of the upper jaw taken along lines A—A of FIG. 15.
FIG. 17 is a sectional elevation view of the upper jaw taken along lines B—B of FIG. 16.

FIGS. 15, 16 and 17 depict another aspect of a preferred embodiment of the present invention. FIG. 15 shows a series of adjustable alignment guides 125a–d, used to stabilize the upper jaw 19. Each alignment guide includes a adjustment bolt 132, a lock nut 133, and a guide flange 131. In use, the adjustable alignment guides are positioned on either side of the upper jaw to keep the upper jaw in line with the lower jaw, thereby maintaining the proper shearing fit between the upper and lower shear blades, and imparting stability to the upper jaw.

The upper jaw 19 moves within a bracketed arc defined by two opposing side plates 134. These side plates include a plurality of stiffener ribs 128 which provide stability to the side plates 134. The upper jaw has two lateral surfaces 127, each of which includes a curvilinear wear plate 130, which acts in conjunction with the guide flanges 131 of the adjustable alignment guides.

As shown in FIG. 16, the adjustment bolt 132 of each alignment guide 125 passes through a hole in the side plate 134. Each adjustment bolt 132 is secured to a cylindrical guide flange 131 positioned on the side of the side plate 134 facing the top jaw lateral surface 127. Each of the guide flanges is tightened against the upper jaw wear plate 130 by the adjustment bolt 132, in order to adjust the position of the upper jaw 19, thus maintaining the proper tolerance between the upper and lower shear blades. The guide flanges also hold the top jaw in place for better shearing performance and obviate the tendency in prior art shears of the top jaw to spread apart from the lower jaw during shearing.

Figure 18:
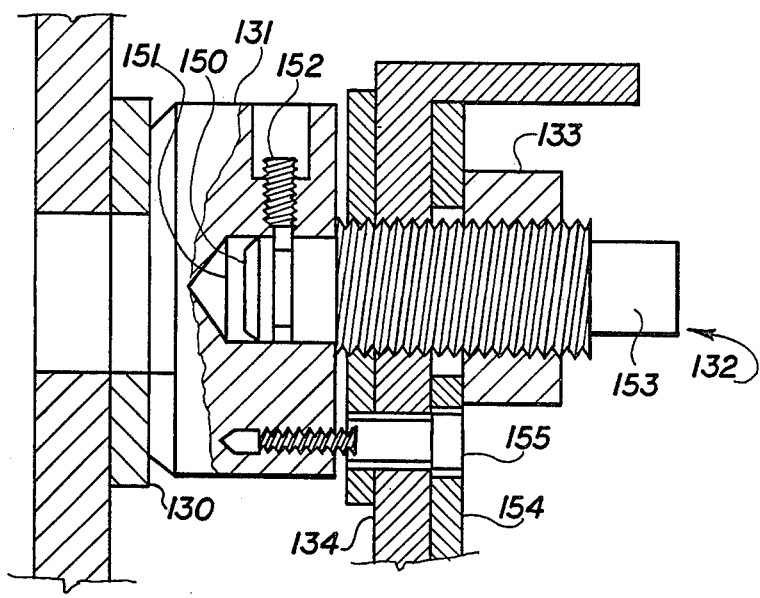
FIG. 18 is a cross sectional view of the adjustable alignment guide of the present invention.

FIG. 18 depicts a more detailed cross sectional view of the adjustable alignment guide of the present invention. As shown, the adjustment bolt 132 is threaded and passes through a threaded hole in the side plate 134. The forward tip 150 of the adjustment bolt 132 rides in a bore 151 in the guide flange 131. A set screw 152 rides in a threaded hole in the guide flange 131 and engages the forward tip 150 of the adjustment bolt 132 to hold the guide flange 131 to the adjustment bolt 132.

In operation, the rearwardtip 153 of the adjustment bolt 132 is configured to accept a wrench or socket head used to turn the adjustment bolt 132, which in turn tightens the guide flange 131 against the upper jaw wear plate 130. Once the guide flange 131 is properly adjusted, the lock nut 133 is tightened against a bearing plate 154 secured to the side plate 134 to tighten the guide flange 131 in position. Further tightening and/or fine adjustment may be made using a plurality of equally-spaced bolts 155, which pass through holes bored through the bearing plate 154 and the side plate 134 and are threaded into the guide flange 131 as shown. Preferably, three or four equally-spaced bolts 155 are used, but more or less could also be used.

The guide flanges 131 and upper jaw wear plates 130 are kept in constant contact during opening and closing of the upper jaw 19. The opposing surfaces of the upper jaw wear plates 130 and guide flanges 131 are kept smooth and well-lubricated to enable the upper jaw 19 to move freely.

FIGS. 15 and 17 show yet another feature of a preferred embodiment of the present invention. The upper jaw 19 and side plates 134 utilize a tie bolt 126, which passes through a hole in each side plate 134 and through a slot 129 in the upper jaw 19 and through each curvilinear wear plate 130. This tie bolt is secured by nuts 135. The slot 129 is curvilinear and shaped to complement the arc of travel described by the upper jaw 19 during opening and closing. The tie bolt 126 provides further stability to the side plates 134, which have a tendency to crack in prior art shears not using a tie bolt.

In operation, the knife seats, knife blades, wear plates, boot tip and piercing point are secured to the shear as disclosed. The upper jaw 19 is opened relative to the stationary lower jaw 23 by the hydraulic means 17b and 18b. The shear then contains the workpiece to be cut within the open jaws, for example, cradling the workpiece in the lower jaw, and the operator activates the hydraulic means to close the jaws and shear the workpiece. As the jaws close relative to each other, the moving upper knife blades 80 and 81 pass traversely by the stationary lower knife blades 70 and 71, effecting a shearing action upon objects held in the lower jaw.

The use of replaceable knife seats to support the knife blades in both jaws prevents wear on the upper and lower shear blades 27 and 27a, respectively, and allows the knife seats to be replaced in the field if needed, without any welding and/or cutting, required by other types of shears. Also, the bolted removable wear plates reduce wear on the shear, permit field replacement and eliminate welding and cutting required by other types of shears. Similarly, the removable boot tip also reduces wear and may be replaced in the field. Additionally, all wear plates can be adjusted in the field to compensate for wear by loosening the securing bolts and adding shims as needed.

I claim:

1. A heavy duty scrap metal shear for attachment to the boom structure and hydraulic system of a back hoe, said shear comprising:
   (a) a lower jaw and an upper jaw with pivot means interconnecting the jaws together, including means for attaching said shear to the hydraulic system of the back hoe for closing and opening the upper jaw relative to the lower jaw;
   (b) the upper jaw further comprising a rigid upper shear blade extending along said upper jaw, the lower jaw having a lower shear blade extending along said lower jaw, said upper and lower shear blades of sufficient strength for shearing a workpiece of scrap metal when the upper shear blade is closed relative to the lower shear blade;
   (c) the upper and lower shear blades further comprising inner and outer workpiece engaging portions opposite to each other, the inner and outer workpiece engaging portions of the upper shear blade extending obliquely of each other;
   (d) the lower shear blade also having a lower shear plate and a rigid guide plate lying along and spaced from the lower shear plate;
   (e) an outer end closure member affixing the lower shear plate and the guide plate to each other at their free ends and serving to define an open slot between the lower shear plate and guide plate to receive the upper jaw therein, said open slot being wider than the width of the upper jaw to maintain a clearance between the upper jaw and the lower shear plate and guide plate when the upper jaw traverses the open slot;

(f) said upper and lower shear blades further comprising at least one upper and at least one lower detachable elongate rigid knife seating means affixed to the upper and lower jaws, respectively, said upper and lower knife seating means adapted to provide securable seating means for at least one upper and at least one lower knife blade means, respectively;

(g) said upper knife blade means being detachably secured to said upper knife seating means, said upper knife seating means being detachably secured to the upper jaw, thereby forming an upper planar shearing surface;

(h) said lower knife blade means being detachably secured to said lower knife seating means, said lower knife seating means being detachably secured to the lower shear plate adjacent to the open slot, thereby forming a lower planar shearing surface;

(i) the upper and lower shearing surface being adapted to be slidably engageable with each other during the shearing movement of the upper shear blade relative to the lower shear blade.

2. A heavy duty shear according to claim 1 wherein the inner surfaces of the open slot are adapted to mountably receive a first and second detachable rigid wear plate, said wear plates serving to minimize the wear on the slot surfaces which occurs when said surfaces interface with the upper jaw during shearing, the first plate being detachably mounted on the inner face defined by said outer end closure member, and the second plate being detachably mounted on the lateral surface of the guide plate within said open slot, said detachable mountings permitting replacement and adjustment of said plates in the field without welding or cutting.

3. A heavy duty shear according to claim 2 including a rigid boot tip conforming to the profile of the forward converging surface of the upper jaw and straddling said forward converging surface and being detachably affixed to one side of the upper jaw.

4. A heavy duty shear according to claim 1 wherein the top supporting edge of the guide plate includes inner and outer portions oriented obliquely of each other to cradle a workpiece therebetween.

5. A heavy duty shear according to claim 1 wherein the open slot is open and unobstructed along the inner edge portion of the lower shear plate.

6. A heavy duty shear according to claim 1 wherein the inner and outer edge portions of the lower shear plate extend obliquely of each other and form an obtuse angle with respect to each other.

7. A heavy duty shear according to claim 1 wherein the inner and outer edges of the upper shear blade form an obtuse angle relative to each other.

8. A heavy duty shear according to claim 1 wherein the lower jaw includes a removable piercing point.

9. A heavy duty shear according to claim 1 wherein each said knife seating means comprises an L-shaped elongated member, each said seating means defining a recess adapted to receive said knife blade means.

10. A heavy duty shear according to claim 9 wherein the upper knife seating means are secured to the upper jaw within upper jaw recesses, and the lower knife seating means are secured to the lower jaw within lower jaw recesses.

11. A heavy duty shear according to claim 3 wherein the knife seating means, knife blade means, wear plates, and boot tip components of said shear are detachably secured to the shear via bolts, which permit removal and replacement of said components in the field without welding or cutting.

12. A heavy duty shear according to claim 2 wherein the first wear plate has a concave surface facing the open slot, said concave surface conforming to an arc described by the forward edge of the upper jaw during shearing.

13. A heavy duty shear according to claim 12 wherein the second wear plate has a leading edge surface contoured to conform to the concave surface of said first wear plate.

14. A heavy duty shear according to claim 10, wherein the knife seats and the knife blades each have a force-bearing surface, the force-bearing surface of each knife seat contacting a surface in the jaw recess within which said knife seat is secured, each said knife seat force-bearing surface having a greater surface area than the force-bearing surface of the knife blade attached to said knife seat, the force-bearing surface of each knife blade contacting the knife seat to which said knife blade is secured, thereby transmitting and distributing shearing forces through said knife seat to said jaw recess surface.

15. A heavy duty shear according to claim 11 in which at least one bolt used to secure the boot tip includes a bolt head having an elongated flattened portion, said boot tip bolt head being positioned within a countersunk hole in said boot tip, said countersunk hole having an elongated flattened portion engaging said bolt head flattened portion thereby preventing said boot tip bolt from becoming loose during operation of the shear.

16. A heavy duty shear according to claim 11 in which at least one bolt securing each said wear plate to the shear includes a bolt head having an elongated flattened portion, each said wear plate bolt head being positioned within a countersunk hole in said wear plate, said countersunk hole having an elongated flattened portion engaging said bolt head flattened portion thereby preventing said wear plate bolt from becoming loose during operation of the shear.

17. A heavy duty shear according to claim 11 in which at least one bolt securing each said knife blade means to the shear includes a bolt head having an elongated flattened portion, said knife blade means bolt head being positioned within a countersunk hole in said knife blade means, said countersunk hole having an elongated flattened portion engaging said bolt head flattened portion thereby preventing said knife blade means bolt from becoming loose during operation of the shear.

18. A heavy duty shear according to claim 1 in which the upper jaw includes a set of curvilinear wear plates attached to said upper jaw, said shear further including a set of side plates bracketing said upper jaw, said side plates further including a plurality of adjustable alignment guides, each said alignment guide including an adjustment bolt engaging a guide flange in contact with one said curvilinear wear plate thereby guiding said upper jaw and maintaining a proper shearing tolerance between the upper and lower shear blades.

* * * * *

UNITED STATES PATENT AND TRADEMARK OFFICE
CERTIFICATE OF CORRECTION

PATENT NO. : 4,776,093
DATED : October 11, 1988
INVENTOR(S) : Sol N. Gross

It is certified that error appears in the above—identified patent and that said Letters Patent is hereby corrected as shown below:

Column 4, line 64, delete the word --an--.

Column 6, line 1, after the word "lower" insert the word "jaw".

Column 6, line 61, after the word "of" delete the word --theknife-- and insert the words "the knife".

Column 7, line 19, after the word "shear", delete the word --blades-- and insert the word "blade"

Column 11, line 55, delete the word --rewardtip-- and insert the words "rearward tip".

Signed and Sealed this

Seventh Day of March, 1989

Attest:

DONALD J. QUIGG

Attesting Officer      Commissioner of Patents and Trademarks